United States Patent
Kagaya et al.

(10) Patent No.: US 10,597,001 B2
(45) Date of Patent: Mar. 24, 2020

(54) PLATE FOR ELECTRO-THERMAL WINDOW

(71) Applicant: AGC Inc., Chiyoda-ku (JP)

(72) Inventors: Osamu Kagaya, Chiyoda-ku (JP);
Hiromasa Tominaga, Chiyoda-ku (JP);
Tomohiro Takahashi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 658 days.

(21) Appl. No.: 15/333,821

(22) Filed: Oct. 25, 2016

(65) Prior Publication Data

US 2017/0036646 A1 Feb. 9, 2017

Related U.S. Application Data

(63) Continuation of application No. PCT/JP2015/057746, filed on Mar. 16, 2015.

(30) Foreign Application Priority Data

Apr. 28, 2014 (JP) ................. 2014-093110

(51) Int. Cl.
*H05B 3/84* (2006.01)
*H05B 3/86* (2006.01)
(Continued)

(52) U.S. Cl.
CPC . *B60S 1/02* (2013.01); *B60S 1/58* (2013.01); *B60S 1/586* (2013.01); *H05B 3/84* (2013.01);
(Continued)

(58) Field of Classification Search
None
See application file for complete search history.

(56) References Cited

U.S. PATENT DOCUMENTS

| | | | |
|---|---|---|---|
| 2,557,983 A | | 6/1951 | Linder |
| 3,366,777 A | * | 1/1968 | Brittan ................ C03C 17/3613 |
| | | | 219/522 |

(Continued)

FOREIGN PATENT DOCUMENTS

| | | |
|---|---|---|
| EP | 1 514 451 | 3/2005 |
| EP | 2 660 930 A1 | 11/2013 |

(Continued)

OTHER PUBLICATIONS

Extended European Search Report dated Mar. 2, 2018 European Patent Application No. 15786231.9, 9 pages.

(Continued)

*Primary Examiner* — Joseph M Pelham
(74) *Attorney, Agent, or Firm* — Oblon, McClelland, Maier & Neustadt, L.L.P.

(57) ABSTRACT

A plate for an electro-thermal window includes a heatable transparent conductive film, and bus bars that feed power to the transparent conductive film. The bus bars include a left bus bar connected to a left side edge and a right bus bar connected to a right side edge of the transparent conductive film. The transparent conductive film is divided into regions by a slit continuously or discontinuously formed from the left bus bar to the right bus bar. The regions include first and second regions. A distance between the left bus bar and the right bus bar of the first region is shorter than a distance between the left bus bar and the right bus bar of the second region. A width of the first region in a direction orthogonal to the slit is shorter than a width of the second region in the direction.

20 Claims, 14 Drawing Sheets

(51) Int. Cl.
  *B60S 1/02* (2006.01)
  *B60S 1/58* (2006.01)
(52) U.S. Cl.
  CPC .......... *H05B 3/86* (2013.01); *H05B 2203/011* (2013.01); *H05B 2203/013* (2013.01); *H05B 2203/031* (2013.01)

(56) References Cited

U.S. PATENT DOCUMENTS

| | | | | |
|---|---|---|---|---|
| 3,982,092 | A * | 9/1976 | Marriott | ............. H05B 3/84 219/203 |
| 4,703,328 | A * | 10/1987 | Jones | ............. H01Q 1/1278 219/203 |
| 5,017,933 | A | 5/1991 | Sakurai et al. | |
| 5,466,911 | A * | 11/1995 | Spagnoli | ............. H05B 3/84 219/203 |
| 5,867,129 | A | 2/1999 | Sauer | |
| 6,130,645 | A * | 10/2000 | Lindenmeier | ....... H01Q 1/1278 343/704 |
| 6,559,419 | B1 | 5/2003 | Sol et al. | |
| 8,022,333 | B2 | 9/2011 | Maeuser | |
| 10,091,840 | B2 * | 10/2018 | Kagaya | ............. H05B 3/84 |
| 10,485,061 | B2 * | 11/2019 | Klein | ............. B32B 17/10229 |
| 2004/0065651 | A1 | 4/2004 | Voeltzel | |
| 2005/0089691 | A1 * | 4/2005 | Noguchi | .......... B32B 17/10174 428/426 |
| 2005/0178756 | A1 | 8/2005 | Degand et al. | |
| 2006/0010794 | A1 | 1/2006 | Walton et al. | |
| 2009/0166347 | A1 * | 7/2009 | Blanchard | ....... B32B 17/10036 219/201 |
| 2010/0091510 | A1 | 4/2010 | Nyderle et al. | |
| 2010/0159251 | A1 | 6/2010 | Brandt | |
| 2013/0092676 | A1 * | 4/2013 | Offermann | ....... B32B 17/10036 219/203 |
| 2013/0153559 | A1 | 6/2013 | Choi et al. | |
| 2013/0285861 | A1 * | 10/2013 | Kagaya | ............. H01Q 1/1271 343/712 |
| 2015/0319808 | A1 * | 11/2015 | Kagaya | ............. H05B 3/84 219/522 |
| 2015/0382406 | A1 * | 12/2015 | Choi | ............. H05B 3/84 219/203 |
| 2016/0174295 | A1 * | 6/2016 | Klein | ............. B32B 17/10192 |

FOREIGN PATENT DOCUMENTS

| | | | |
|---|---|---|---|
| GB | 2 381 179 A | 4/2003 | |
| JP | 1-147508 U | 10/1989 | |
| JP | 3-25355 U | 3/1991 | |
| JP | 5-22025 A | 1/1993 | |
| JP | 5-84546 U | 11/1993 | |
| JP | 2002020142 A * | 1/2002 | ....... B32B 17/10036 |
| JP | 2003-170739 A | 6/2003 | |
| JP | 2006-500754 | 1/2006 | |
| JP | 2008-56225 | 3/2008 | |
| JP | 2012-512749 | 6/2012 | |
| WO | WO 03/105532 A1 | 12/2003 | |
| WO | WO 2008/135148 A2 | 11/2008 | |
| WO | 2 665 336 A2 | 11/2013 | |

OTHER PUBLICATIONS

International Search Report dated Jun. 16, 2015 in PCT/JP2015/057746, filed on Mar. 16, 2015 (with English Translation).
Written Opinion dated Jun. 16, 2015 in PCT/JP2015/057746, filed on Mar. 16, 2015.

* cited by examiner

PLATE FOR ELECTRO-THERMAL WINDOW

CROSS-REFERENCE TO RELATED APPLICATION

This application is a U.S. continuation application filed under 35 USC 111(a) claiming benefit under 35 USC 120 and 365(c) of PCT application PCT/JP2015/057746, filed on Mar. 16, 2015, which claims priority to Application Ser. No. 2014-093110, filed in Japan on Apr. 28, 2014. The foregoing applications are hereby incorporated herein by reference.

TECHNICAL FIELD

The present invention generally relates to a plate for an electro-thermal window including a heatable transparent conductive film and multiple bus bars for feeding electric power to the transparent conductive film.

BACKGROUND ART

Conventionally, a plate for an electro-thermal window formed with a transparent conductive film is known (see, for example, Patent Document 1). A bus bar is formed on both ends of the transparent conductive film formed in the plate for an electro-thermal window. One bus bar is connected to a direct current power source whereas another bus bar is grounded. When the transparent conductive film is energized, the transparent conductive film generates heat, so that fog (water droplets) or the like created on the plate for the window can be removed. However, by forming the transparent conductive film, the transmission of electromagnetic waves becomes difficult. Therefore, Patent Document 1 discloses multiple openings being orderly arranged through which electromagnetic waves of a predetermined frequency can be transmitted.

RELATED ART DOCUMENT

Patent Document

Patent Document 1: U.S. Patent Publication No. 2006/0010794

In a case where a plate for a window (e.g., window glass for an automobile) has a substantially trapezoid shape, the transparent conductive film is also formed with a substantially trapezoid shape. In a case where a bus bar is formed on the left and right sides of the substantially trapezoidal-shaped transparent conductive film, the distance between the bus bars becomes different in the vertical direction. Therefore, electric current tends to concentrate at an area where the distance between the bus bars is short and may cause a local area to be heated to a high temperature.

In light of the above, an aspect of the present invention is to provide a plate for an electro-thermal window that prevents local areas from being heated to a high temperature.

SUMMARY OF THE INVENTION

In order to solve the above-described problems, an embodiment of the present invention provides a plate for an electro-thermal window that includes a transparent conductive film that can be heated, and multiple bus bars that feed power to the transparent conductive film. The multiple bus bars include a left bus bar connected to a left side edge part of the transparent conductive film and a right bus bar connected to a right side edge part of the transparent conductive film. The transparent conductive film is divided into multiple regions by a slit that is continuously or discontinuously formed from the left bus bar to the right bus bar. The multiple regions include a first region and a second region. A distance between the left bus bar and the right bus bar of the first region is shorter than a distance between the left bus bar and the right bus bar of the second region. A width of the first region in a direction orthogonal to the slit is shorter than a width of the second region in the direction orthogonal to the slit.

DESCRIPTION OF EMBODIMENTS

Figure 1:
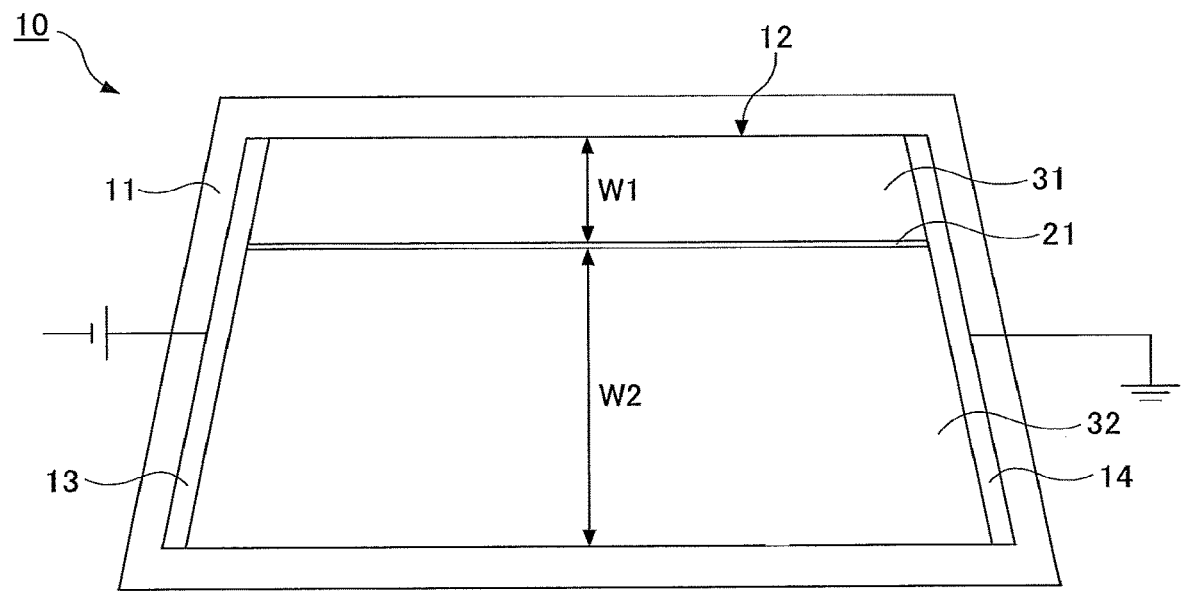
FIG. 1 is a diagram illustrating a plate for an electro-thermal window according to an embodiment of the present invention.

The invention will be described with reference to the accompanying drawings. Throughout the drawings, like components and corresponding configurations are denoted with like reference numerals and further explanation thereof is omitted. In the following description, directions are described based on the directions of the drawings. Terms that indicate directions such as parallel or orthogonal may differ to the extent that such difference does not impair the effects of the invention. Each drawing is a diagram viewed from a side facing a surface of the plate for the electro-thermal window. Each drawing is a diagram viewing the inside of a vehicle in a state where the plate for the electro-thermal window is attached to the vehicle. However, each drawing may be assumed to be a diagram viewing the outside of the vehicle. In each drawing, a vertical direction corresponds to a vertical direction of a vehicle in which a bottom side of each drawing corresponds to the side of a road. Further, in a case where the plate for the electro-thermal window is a front glass attached to the front of a vehicle, a lateral direction corresponds to a width direction of the vehicle. Further, the electro-thermal window is not limited to a front glass but may also be a rear glass attached to the rear of a vehicle or a side glass attached to the side of a vehicle.

FIG. 1 is a diagram illustrating a plate for an electro-thermal window according to an embodiment of the present invention. A plate for an electro-thermal window 10 is attached to an opening part of a window of a vehicle. The plate for an electro-thermal window 10 may be, for example, attached to a window of the front of an automobile. That is, the plate for an electro-thermal window 10 may be provided at the front of a driver of an automobile.

As illustrated in FIG. 1, the plate for an electro-thermal window 10 includes a substantially trapezoidal-shaped plate for a window 11, a substantially trapezoidal-shaped transparent conductive film 12, a left bus bar 13, and a right bus bar 14. Note that the term "substantially trapezoidal-shaped" is a shape in which an upper side is shorter than a lower side, and preferably a shape in which the lengths between the upper side and the lower side are no less than 10% different from each other.

The plate for a window 11 includes a transparent plate. The transparent plate may be formed of an insulating material such as glass or resin. The glass may be, for example, soda-lime glass. Further, the resin may be, for example, polycarbonate (PC).

The plate for a window 11 may include multiple transparent plates. The multiple transparent plates may be layered having an intermediate film (e.g., resin film) disposed therebetween. In this case, the transparent conductive film 12, the left bus bar 13, and the right bus bar 14 may be provided between multiple insulating transparent plates. A conductive sheet is connected to each of the left bus bar 13 and the right bus bar 14. Each conductive sheet projects outward from the plate for a window 11 to form an electrode.

The plate for a window 11 may have a curved shape protruding to the outside of the vehicle. The transparent plate of the plate for a window 11 may bent and molded by thermal processing. Multiple bent transparent plates may be press-bonded and interposed by the intermediate film.

The transparent conductive film 12 may be, for example, a metal film such as an Ag film, a metal oxide film such as a tin-doped indium oxide (ITO) film, or a resin film including fine conductive particles. The transparent conductive film 12 may be formed of layers of various kinds of films.

The transparent conductive film 12 may be formed on an insulating transparent plate. After being deposited on the transparent plate, the transparent conductive film 12 may be bent and molded together with the transparent plate. Alternatively, the transparent conductive film 12 may be deposited on a resin sheet. The transparent conductive film 12, interposed by the resin sheet, may be laminated on a transparent plate that is bent and molded beforehand.

The method for depositing the transparent conductive film 12 may be, for example, a dry-coating method. The dry-coating method may be a physical vapor deposition (PVD) method or a chemical vapor deposition (CVD) method. The PVD method is preferably a vacuum deposition method, a sputtering method, or an ion plating method, and more preferably, a sputtering method capable of depositing on a large area.

Although this embodiment uses a dry-coating method as the method for depositing the transparent conductive film 12, a wet-coating method may be used.

The transparent conductive film 12 may have a substantially trapezoidal shape and may be formed slightly smaller than an outer shape of the substantially trapezoidal-shaped plate for a window 11. The upper side of the transparent conductive film 12 is substantially parallel to the lower side of the transparent conductive film 12 and shorter than the lower side of the transparent conductive film 12. The distance between the left bus bar 13 and the right bus bar 14 (hereinafter referred to as "bus bar distance") becomes shorter toward the upper direction from the lower side of the transparent conductive film 12.

The left bus bar 13 and the right bus bar 14 are formed along the side edges of the substantially trapezoidal-shaped transparent conductive film 12 and arranged to form an inverted V shape. The distance between the left bus bar 13 and the right bus bar 14 gradually becomes longer from the upper side to the lower side. The left bus bar 13 is connected to a left-side edge part of the transparent conductive film 12. The right bus bar 14 is connected to a right-side edge part of the transparent conductive film 12. Further, each of the left bus bar 13 and the right bus bar 14 is formed from a continuous conductor.

The left bus bar 13 is electrically connected to an electric power source whereas the right bus bar 14 is grounded. Alternatively, the left bus bar 13 may be grounded whereas the right bus bar 14 is electrically connected to an electric power source.

The left bus bar 13 and the right bus bar 14 supply electric power to the transparent conductive film 12 to allow the transparent conductive film 12 to generate heat. Thereby, fog or the like created on the plate for a window 11 can be removed. Thus, visibility can be attained for the passenger of the vehicle.

The transparent conductive film 12 of this embodiment is divided into multiple regions by the slit 21 continuously formed from the left bus bar 13 to the right bus bar 14. The multiple regions include a first region 31 and a second region 32.

The slit 21 may be formed substantially parallel to the upper and lower sides of the transparent conductive film 12. The slit 21 may be formed by using a laser or the like. The slit 21 penetrates the transparent conductive film 12 in the thickness direction.

The slit 21 may be formed in an area that would not obstruct the view of the passenger (e.g., driver) of the vehicle. For example, the slit 21 may be formed in an area no greater than 500 mm (preferably, no greater than 400 mm, and more preferably, no greater than 300 mm) from the upper side of the transparent conductive film 12 in a downward direction from the upper side of the transparent conductive film 12.

Substantially the same amount of voltage is applied to the first region 31 and the second region 32 by simultaneously supplying electric power from the single left bus bar 13 and the single right bus bar 14.

The difference between the maximum value and the minimum value of the bus bar distances in the first region 31 is less than the difference between the maximum value and the minimum value of the bus bar distance of the entire transparent conductive film 12. The same applies to the second region 32. Therefore, compared to a case where no slit 21 is formed, concentration of electric current can be reduced. Accordingly, the heating of local areas in the transparent conductive film 12 can be prevented.

The electric resistance of the first region 31 is not only defined by the bus bar distance of the first region 31 but also by, for example, the width of the first region 31 in a direction (vertical direction in FIG. 1) orthogonal to the slit 21 (hereinafter referred to as "vertical direction width"). The electric resistance becomes larger the greater the bus bar distance and becomes smaller the greater the vertical direction width. The same applies to the second region 32.

The bus bar distance of the first region 31 is shorter than the bus bar distance of the second region 32. In addition, the vertical direction width of the first region 31 is shorter than the vertical direction width of the second region 32. Therefore, compared to a case where a vertical direction width W1 of the first region 31 is equal to or greater than a vertical direction width W2 of the second region 32, the difference of the electric resistance between the first region 31 and the second region 32 and the difference of the electric current flowing in the first region 31 and the second region 32 are small. Accordingly, the heating of local areas in the transparent conductive film 12 can be further prevented. In a case of comparing the bus bar distance between respective regions, the bus bar distance may be an average value.

The transparent conductive film 12, by way of the slit 21, forms a frequency selective surface through which a vertically polarized electromagnetic wave of a predetermined frequency is to be transmitted. Thereby, communication inside and outside the vehicle can be achieved. The slit 21 may be formed at an upper part of the transparent conductive film 12, so that a wide area inside the vehicle can be used for communicating with the outside of the vehicle.

The length of the slit 21 is preferably equal to or greater than $\lambda_g/2$ in a case where the wavelength of the vertically polarized transmitted wave of a center frequency in the atmosphere is "$\lambda_0$", the wavelength shortening rate of the plate for an electro-thermal window 10 is "k", and the wavelength in the electro-thermal window 10 is "$\lambda_g=\lambda_0 \cdot k$". For example, when the wavelength shortening rate "k" in a case where the center frequency of the vertically polarized transmitted wave is 900 MHz, the length of the slit 21 is preferably equal to or greater than 85 mm. Further, in a case where the center frequency of the vertically polarized transmitted wave is 1.9 GHz, the length of the slit 21 is preferably greater than or equal to 40 mm. Normally, the distance between the left bus bar 13 and the right bus bar 14 is sufficiently longer than 85 mm. In a case where the plate for an electro-thermal window 10 is a glass plate formed by laminating two glass sheets interposed by an intermediate film formed of polyvinyl butyral, the wavelength shortening rate k is approximately 0.51.

Figure 2:
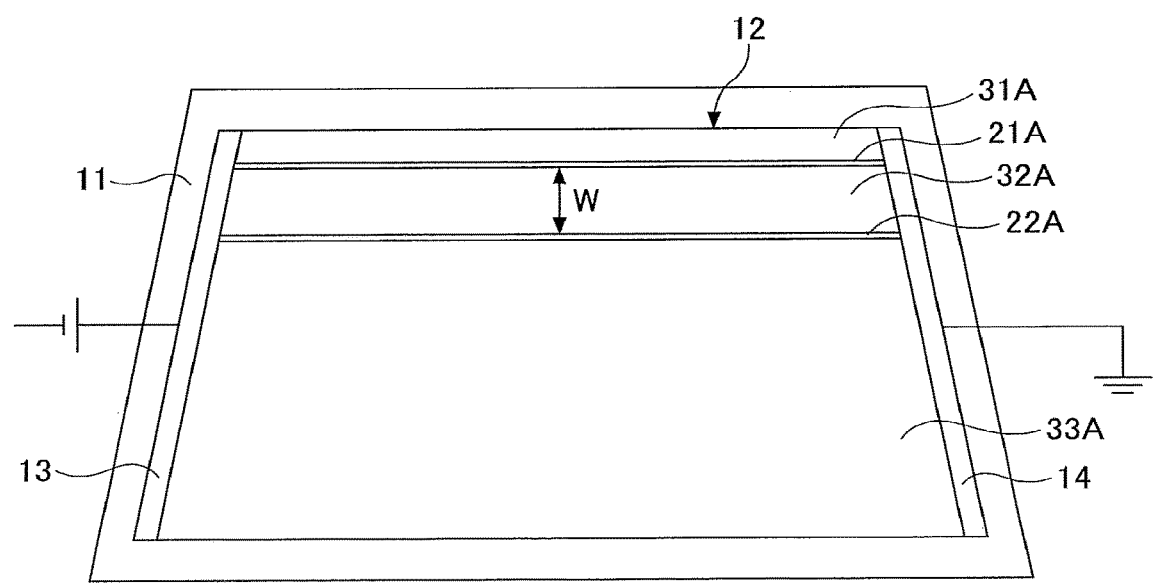
FIG. 2 is a diagram illustrating a plate for an electro-thermal window according to a first modified example.

FIG. 2 is a diagram illustrating a plate for an electro-thermal window according to a first modified example. In this modified example, multiple slits 21A, 22A are formed in the transparent conductive film 12. Each of the slits 21A, 22A may be formed substantially parallel to the upper and lower sides of the transparent conductive film 12.

The transparent conductive film 12 is divided into a first region 31A, a second region 32A, and a third region 33A. The difference between the maximum value and the minimum value of the bus bar distances in the first region 31A is less than the difference between the maximum value and the minimum value of the bus bar distance of the entire transparent conductive film 12. The same applies the second region 32A and the third region 33A. Therefore, compared to a case where no slit 21 is formed, concentration of electric current can be reduced. Accordingly, the heating of local areas in the transparent conductive film 12 can be prevented.

The electric resistance of the first region 31A is not only defined by the bus bar distance of the first region 31A but also by, for example, the vertical direction width of the first region 31A. The electric resistance becomes larger the greater the bus bar distance and becomes smaller the greater the vertical direction width. The same applies to the second region 32A and the third region 33A.

Among the three regions, the first region 31A has a bus bar distance that is shorter than the bus bar distance of the second region 32A, and the second region 32A has a bus bar distance that is shorter than the bus bar distance of the third region 33A. In addition, the first region 31A has a vertical direction width that is shorter than the vertical direction width of the second region 32A, and the second region 32A has a vertical direction width that is shorter than the vertical direction width of the third region 33A. Therefore, compared to a case where the vertical direction widths of each of the regions are equal, the difference among the electric resistance of the first, second, and third regions 31A, 32A, 33A is small. The difference among the electric current flowing in the first, second, and third regions 31A, 32A, 33A is also small. Accordingly, the heating of local areas in the transparent conductive film 12 can be further prevented.

According to this modified example, the transparent conductive film 12 is divided into three or more regions, and the vertical direction width becomes shorter as the bus bar distance of the region becomes shorter. Accordingly, the heating of local areas in the transparent conductive film 12 can be further prevented.

Further, according to this modified example, the transparent conductive film 12 is divided into three or more regions, and as the vertical width among the three regions becomes shorter, the bus bar distance becomes shorter. Accordingly, the heating of local areas in the transparent conductive film 12 can be further prevented.

Further, according to this modified example, vertically polarized electromagnetic waves of a frequency band can be easily transmitted because multiple slits 21A, 22A are formed.

The interval W between adjacent slits 21A and 22A is preferably less than or equal to $\lambda_g/4$. For example, when the wavelength shortening rate "k" is 0.51 in a case where the center frequency of the vertically polarized transmitted wave is 900 MHz, the interval W between adjacent slits 21A and 22A is preferably less than or equal to 43 mm. Further, in a case where the center frequency of the vertically polarized transmitted wave is 1.9 GHz, the interval W between adjacent slits 21A and 22A is preferably less than or equal to 20 mm. The transmittance of a vertically polarized wave is sufficiently high if the interval W is less than or equal to $\lambda_g/4$.

Note that, in a case where three or more slits are formed, at least one pair of adjacent slits may have an interval W that is less than or equal to $\lambda_g/4$.

Figure 3:
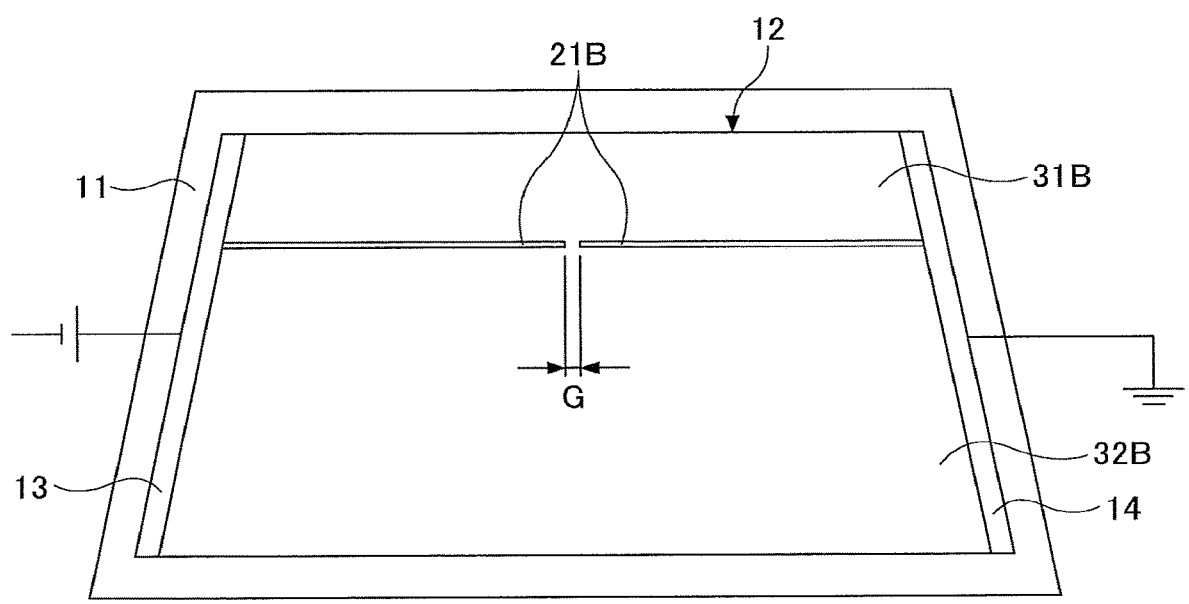
FIG. 3 is a diagram illustrating a plate for an electro-thermal window according to a second modified example.

FIG. 3 is a diagram illustrating a plate for an electro-thermal window according to a second modified example. In this modified example, a slit 21B is formed in the transparent conductive film 12. The slit 21B may be formed substantially parallel to the upper and lower sides of the transparent conductive film 12. The slit 21B is discontinuously formed from the left bus bar 13 to the right bus bar 14. Although the slit 21B in FIG. 3 is formed with a single notch, the slit 21B may be formed with multiple notches.

In the case where the slit 21B is discontinuously formed, a gap G of the notch of the slit 21B may be, for example, less than or equal to 32 mm. If the gap G is less than or equal to 32 mm, electric current between the first and second regions 31B, 32B divided by the slit 21B can practically be separated. The gap G is preferably less than or equal to 16 mm.

The transparent conductive film 12 is divided into the first region 31b and the second region 32B. The difference between the maximum value and the minimum value of the bus bar distances in the first region 31B is less than the difference between the maximum value and the minimum value of the bus bar distance of the entire transparent conductive film 12. The same applies to the second region 32B. Therefore, compared to a case where no slit 21B is formed, concentration of electric current can be reduced. Accordingly, the heating of local areas in the transparent conductive film 12 can be prevented.

The electric resistance of the first region 31B is not only defined by the bus bar distance of the first region 31B but also by, for example, the vertical direction width of the first region 31B. The electric resistance becomes larger the longer the bus bar distance and becomes mailer the longer the vertical direction width. The same applies to the second region 32B.

The bus bar distance of the first region 313 is shorter than the bus bar distance of the second region 32B. In addition, the vertical direction width of the first region 31B is shorter than the vertical direction width of the second region 32B. Therefore, compared to a case where, for example, the vertical direction width of each region is equal, the difference of the electric resistance between the first region 31B and the second region 32B and the difference of the electric current flowing in the first region 31B and the second region 32B when voltage is applied are small. Accordingly, the heating of local areas in the transparent conductive film 12 can be further prevented.

Similar to the slit 21B illustrated in FIG. 3, the slits 21A, 22A illustrated in FIG. 2 may be discontinuously formed from the left bus bar 13 to the right bus bar 14.

PRACTICAL EXAMPLES

[Samples 1 to 5]

The temperature distribution of samples 1 to 5 was analyzed by thermal simulation in a case where voltage is applied to a transparent conductive film of a laminated glass including the transparent conductive film. The samples 1 to 4 are practical examples whereas the sample 5 is a comparative example.

To simplify the analysis, the laminated glass included a glass plate, a transparent conductive film, and a glass plate in this order but did not include an intermediate film. The dimensions and physical properties of each of the elements were as follows.

Thickness of each glass plate: 2.0 mm
Thermal conductivity of each glass plate: 1.0 W/(m·K)
Specific heat of each glass plate: 670 J/(kg·K)
Mass density of each glass plate: 2.2 g/cm$^3$
Thickness of transparent conductive film: 0.002 mm
Electric conductivity of transparent conductive film: 625000 $\Omega^{-1} \cdot m^{-1}$
Thermal conductivity of transparent conductive film: 420 W/(m·K)
Specific heat of transparent conductive film: 235 J/(kg·K)
Mass density of transparent conductive film: 1.07 g/cm$^3$ A finite element analysis model of the laminated glass was fabricated by using software "Hypermesh" manufactured by Altair Engineering Ltd. The temperature distribution when applying voltage between the bus bars of this model was obtained by using a general-purpose finite element analysis software program "Abaqus/Standard" manufactured by Dassault Systemes Ltd.

The initial temperature of the laminated glass was 23° C., and a heat transfer boundary condition was set to a boundary between air and the laminated glass. The heat transfer boundary condition is a boundary condition that enables heat transfer to occur between air and the laminated glass. The heat transfer coefficient was 8.0 W/m$^2$·K, and the temperature of air was constantly 23° C. The voltage between the bus bars was 24 V.

Figure 4:
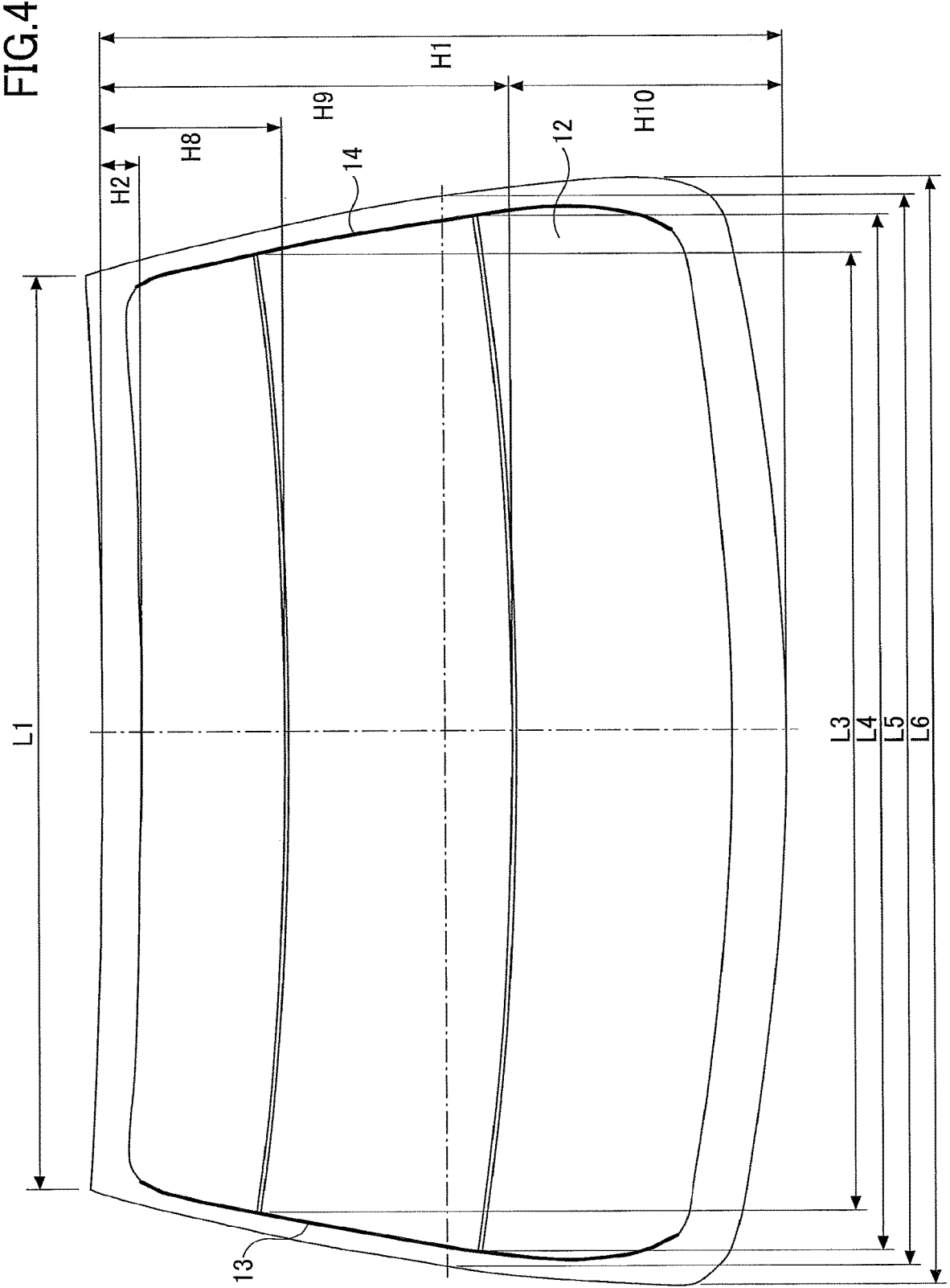
FIG. 4 is a diagram illustrating laminated glass according to a first sample.
Figure 5:
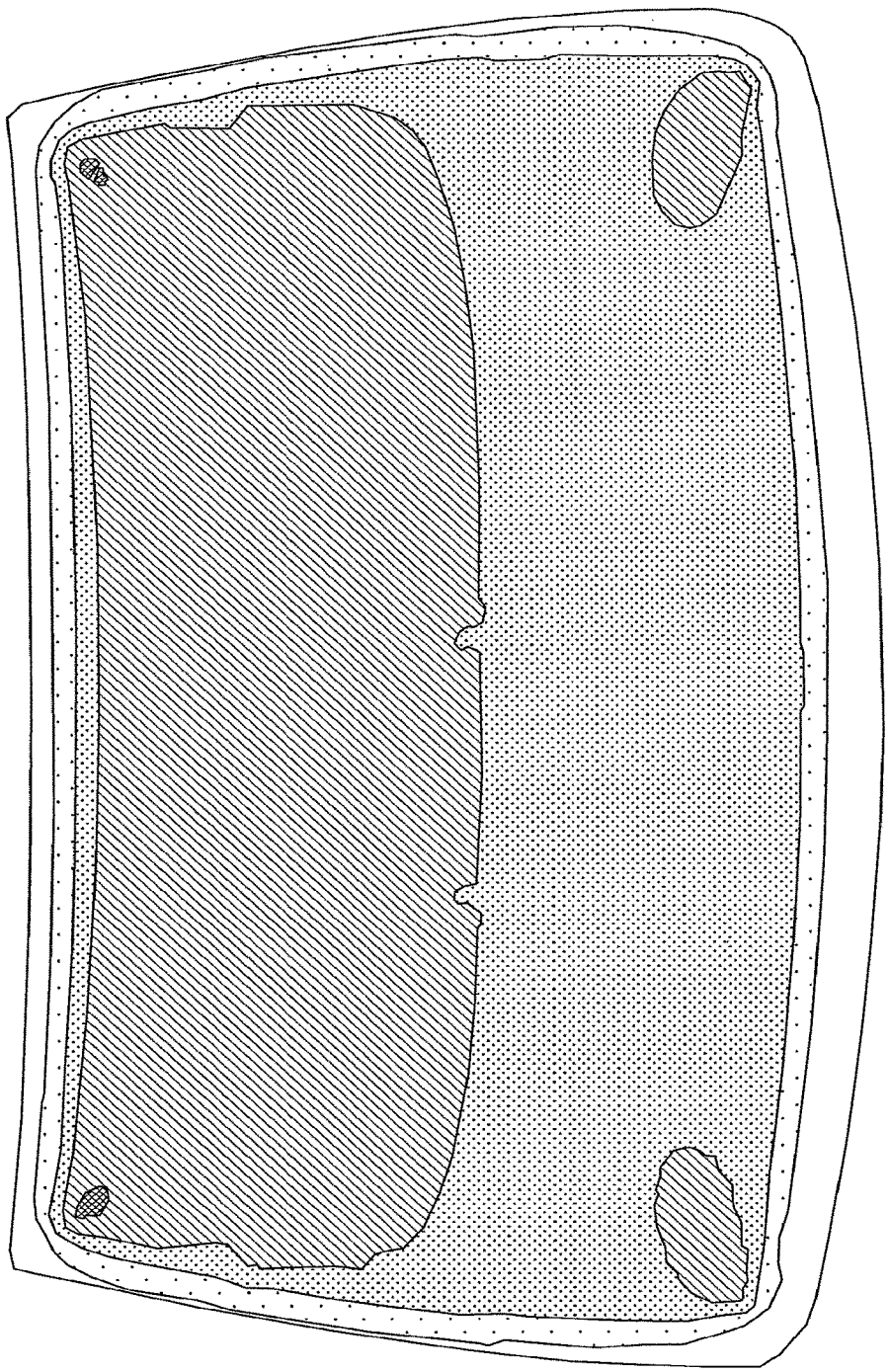
FIG. 5 is a diagram illustrating temperature distribution in a case of applying voltage to the laminated glass according to the first sample.
Figure 5:
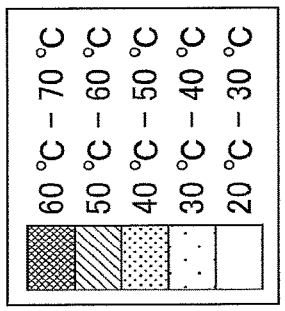
Figure 6:
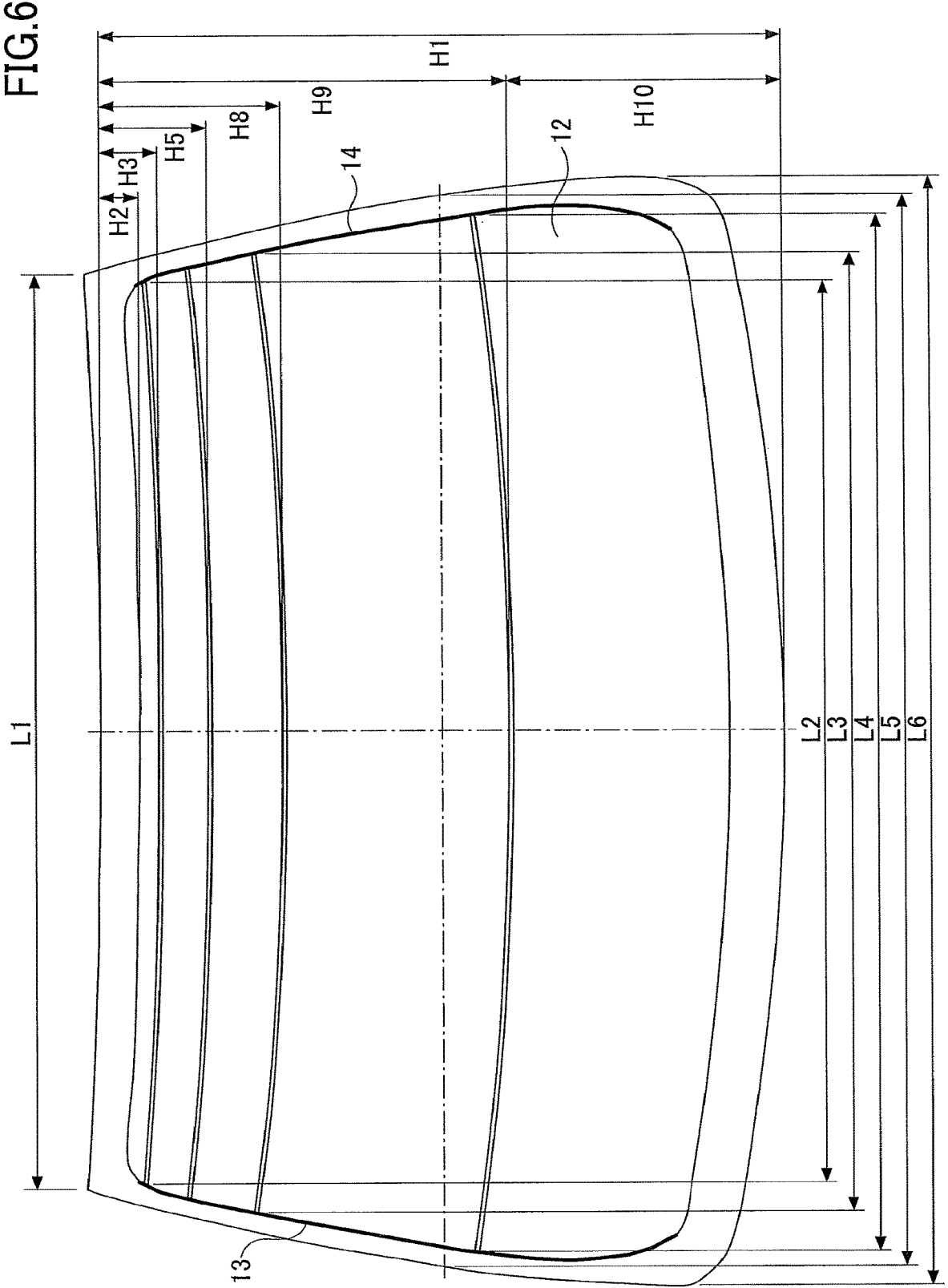
FIG. 6 is a diagram illustrating laminated glass according to a second sample.
Figure 7:
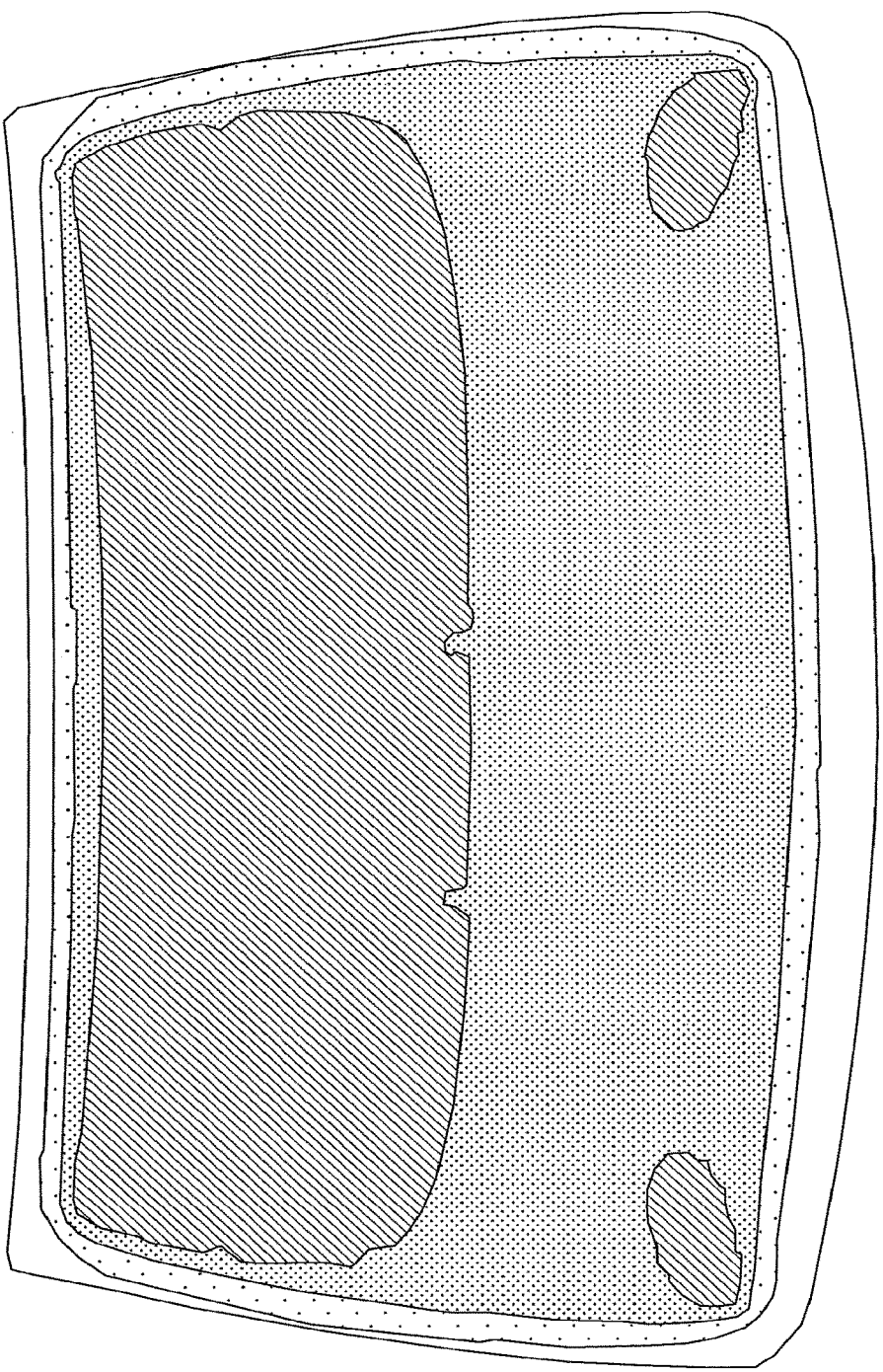
FIG. 7 is a diagram illustrating temperature distribution in a case of applying voltage to the laminated glass according to the second sample.
Figure 7:
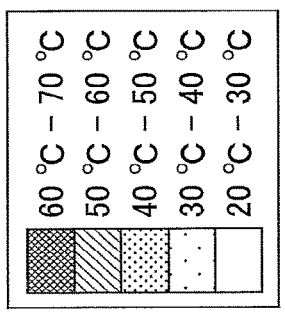
Figure 8:
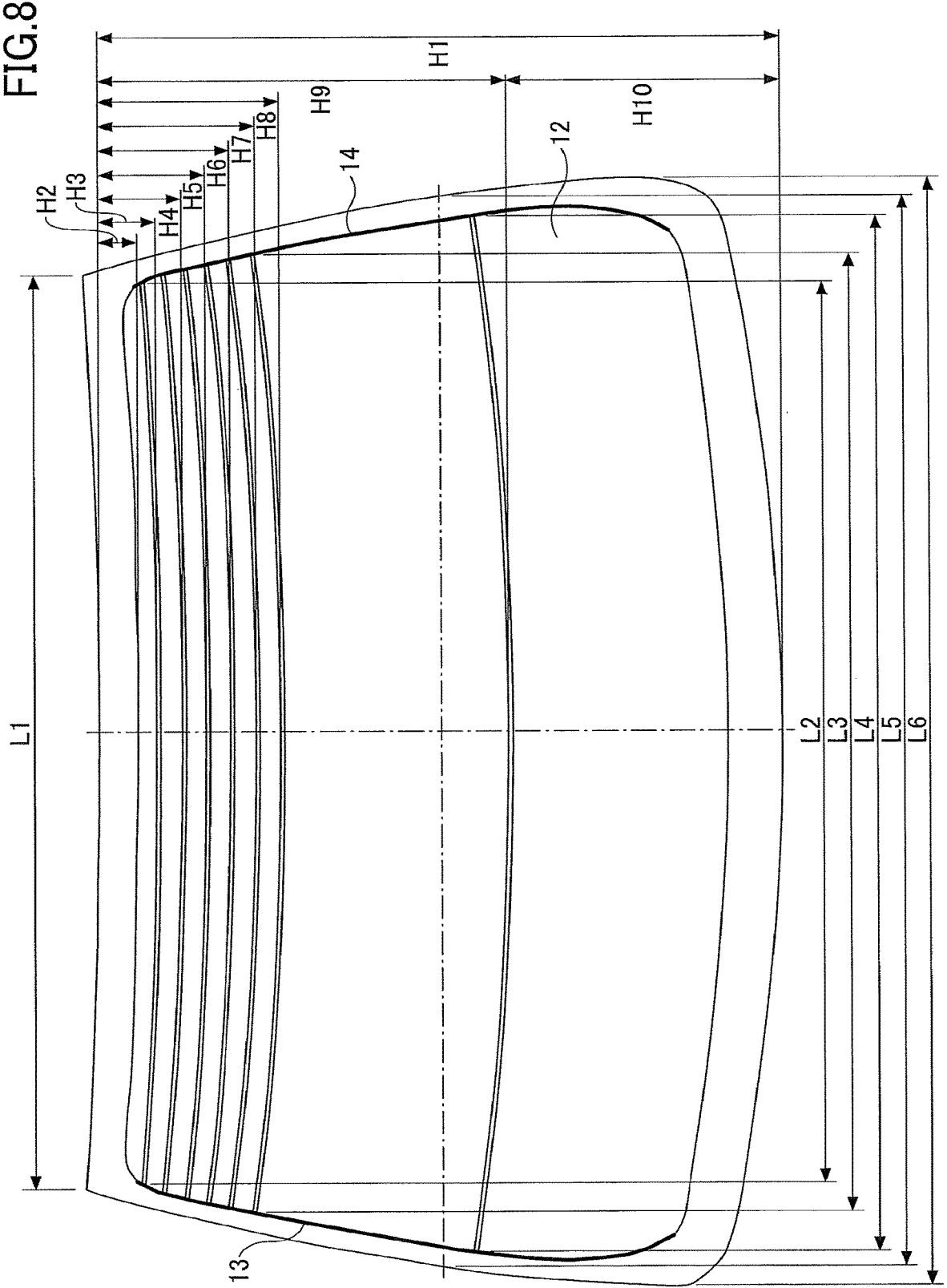
FIG. 8 is a diagram illustrating laminated glass according to a third sample.
Figure 9:
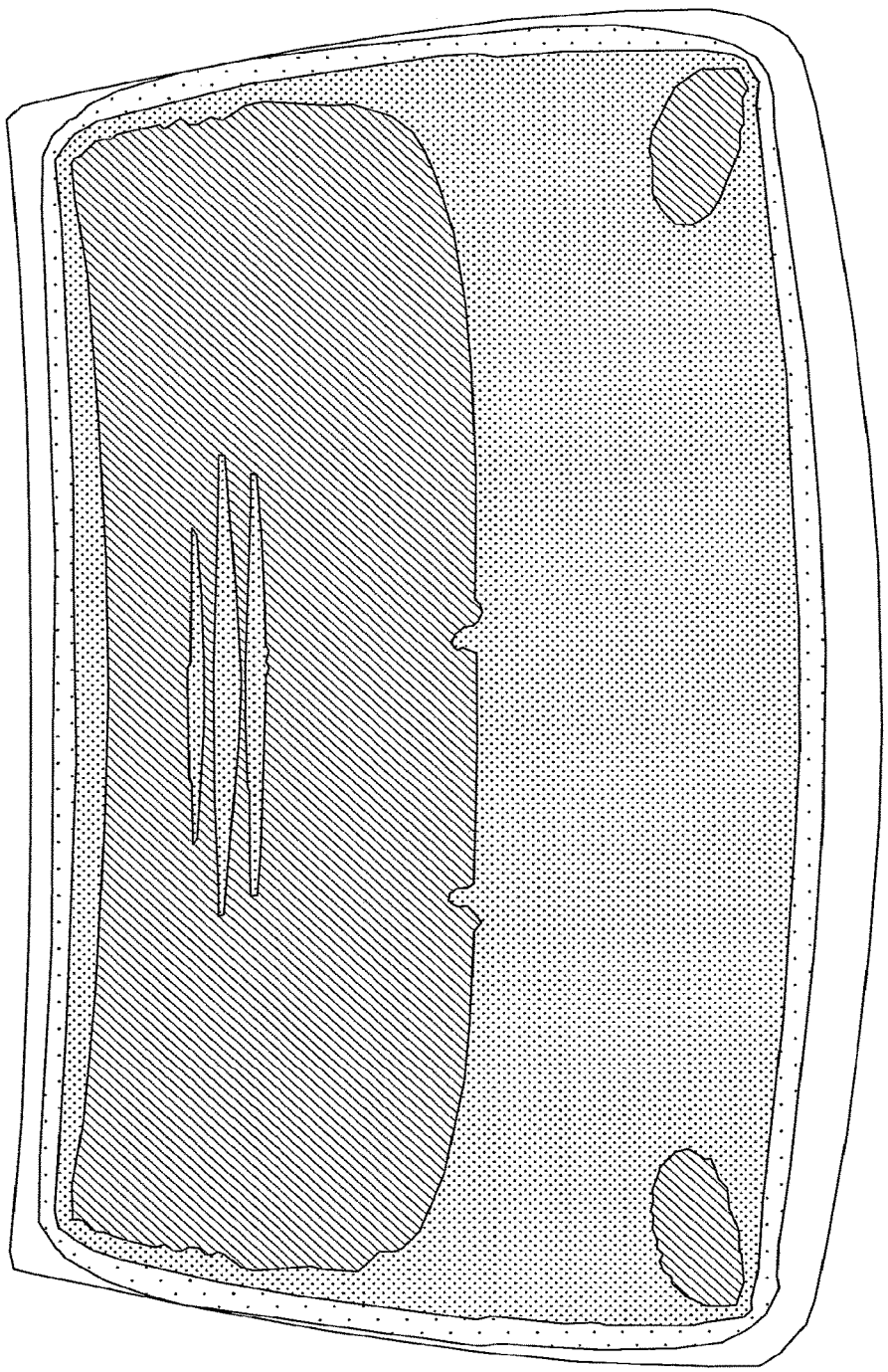
FIG. 9 is a diagram illustrating temperature distribution in a case of applying voltage to the laminated glass according to the third sample.
Figure 9:
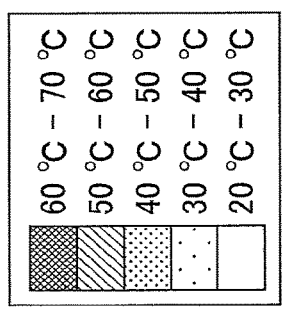
Figure 10:
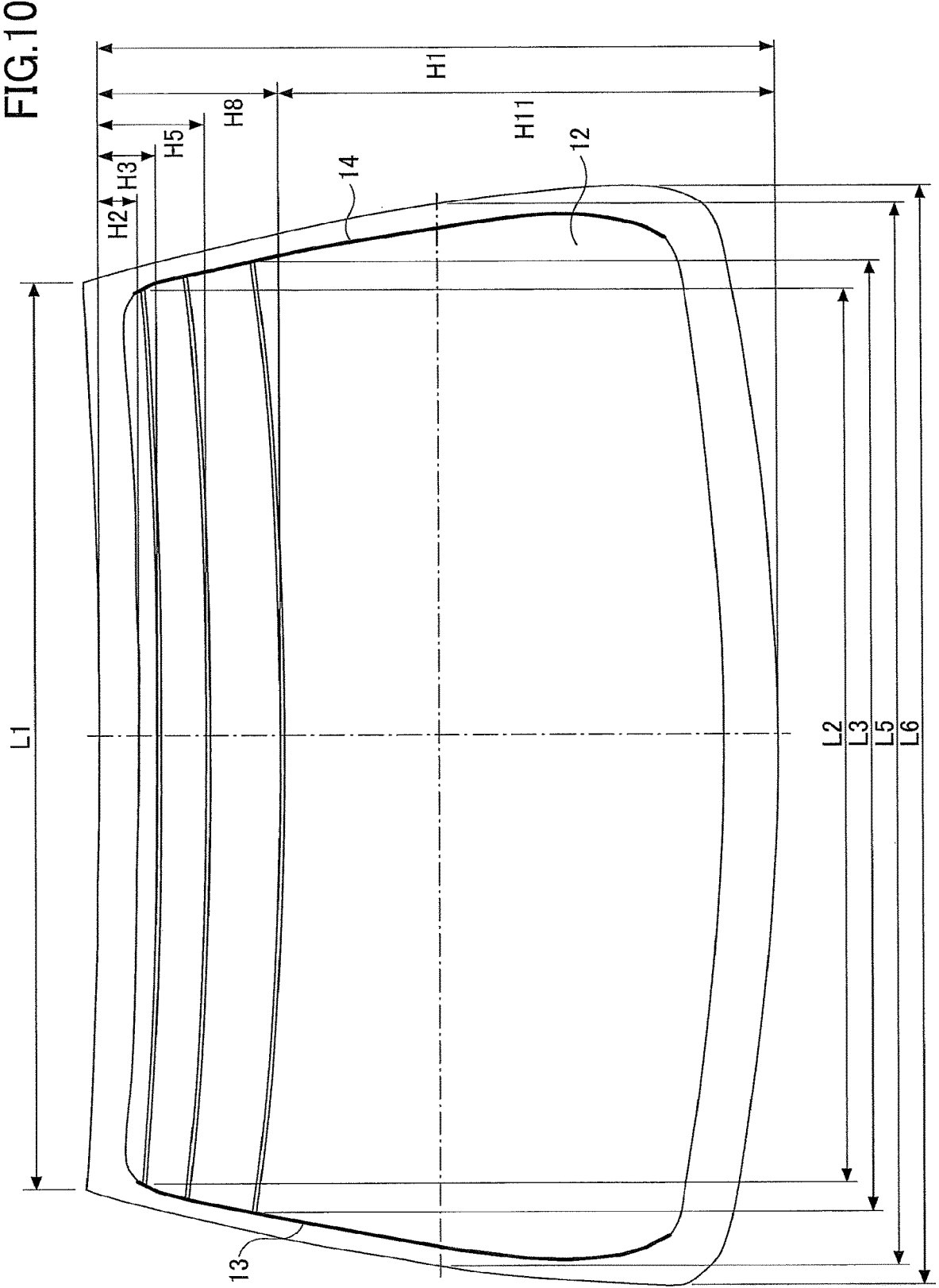
FIG. 10 is a diagram illustrating laminated glass according to a fourth sample.
Figure 11:
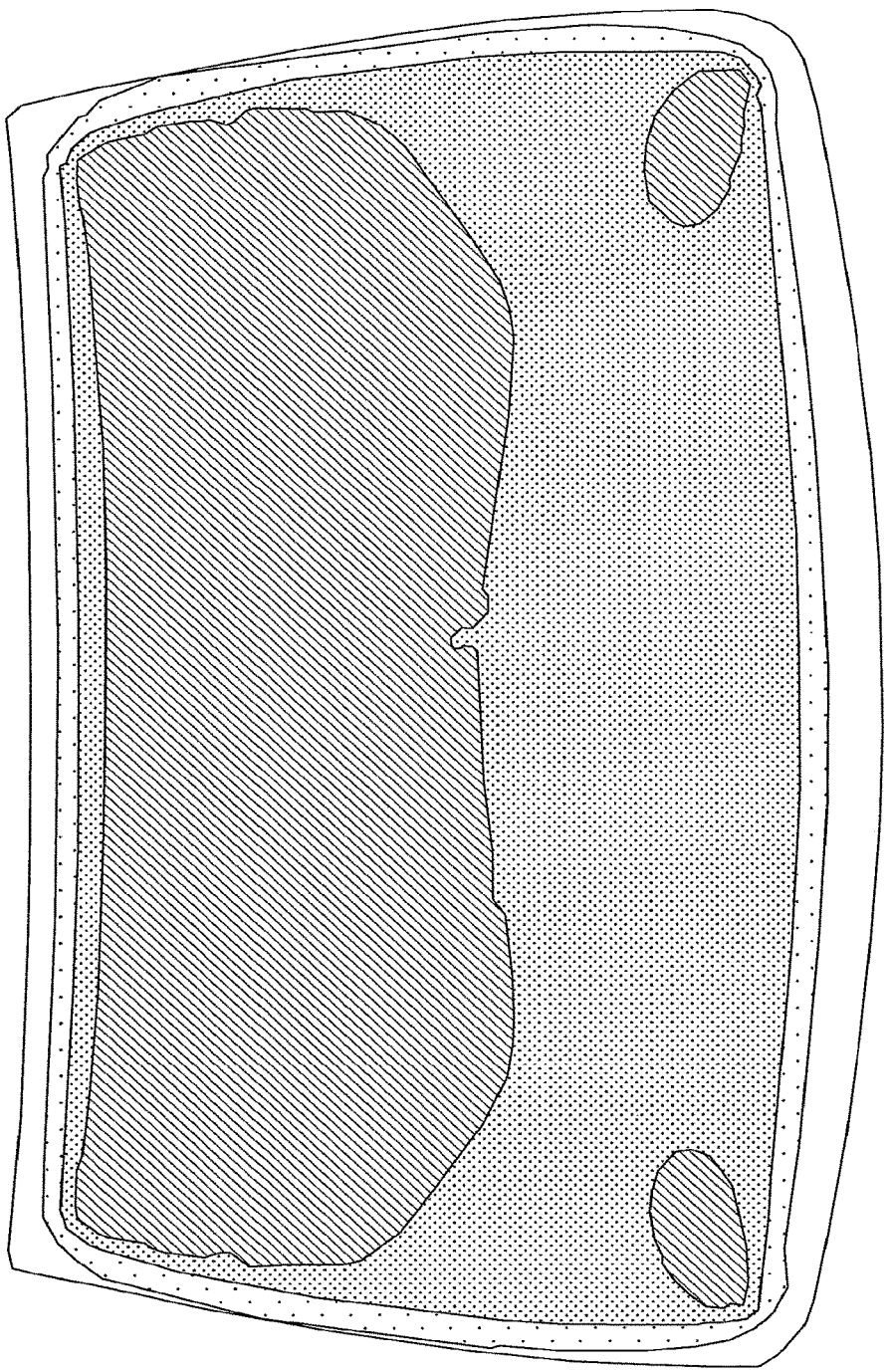
FIG. 11 is a diagram illustrating temperature distribution in a case of applying voltage to the laminated glass according to the fourth sample.
Figure 11:
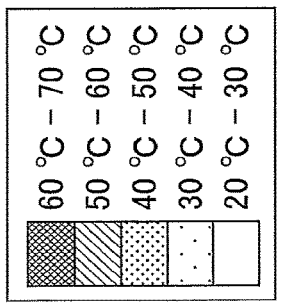
Figure 12:
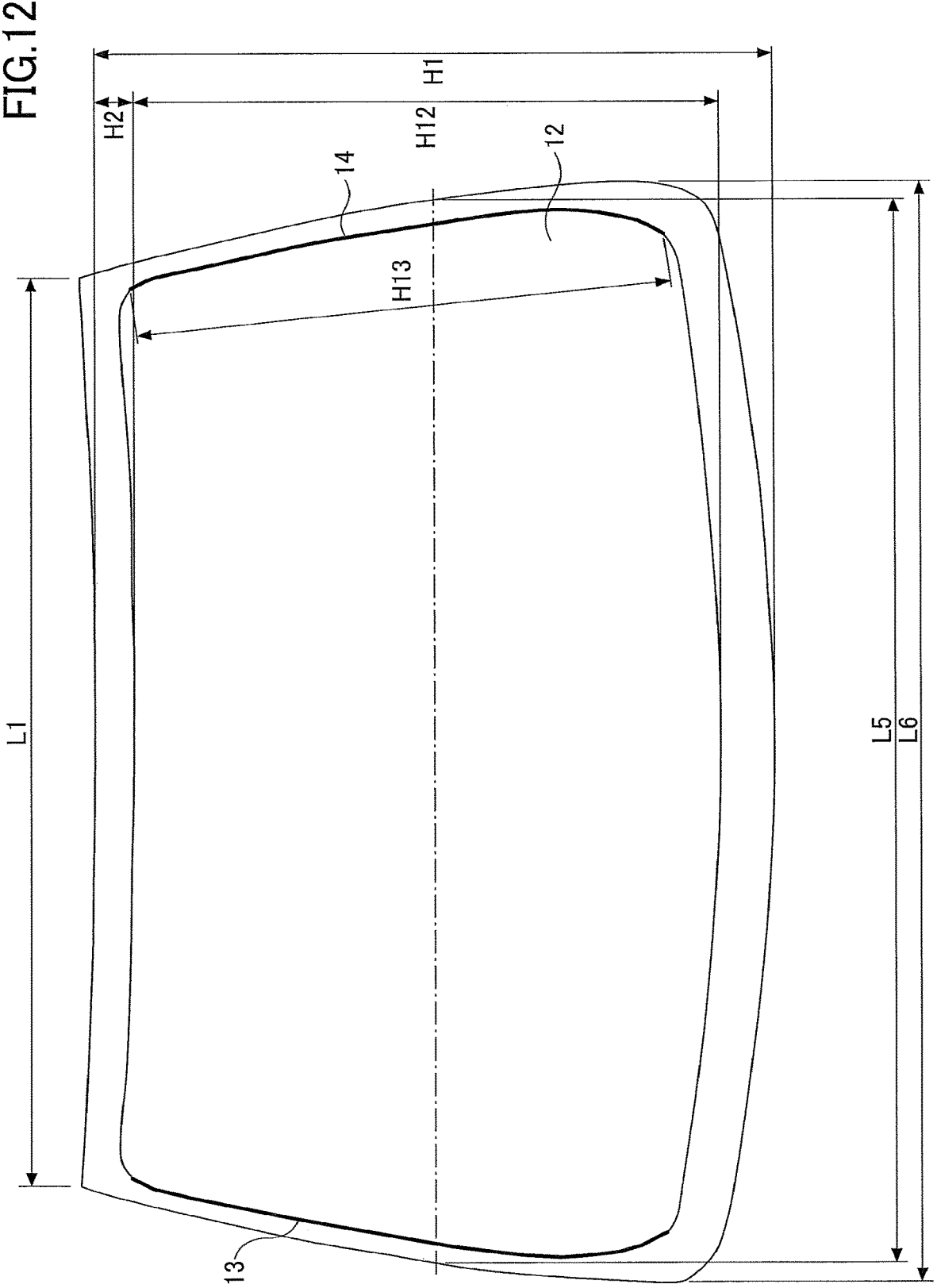
FIG. 12 is a diagram illustrating laminated glass according to a fifth sample.
Figure 13:
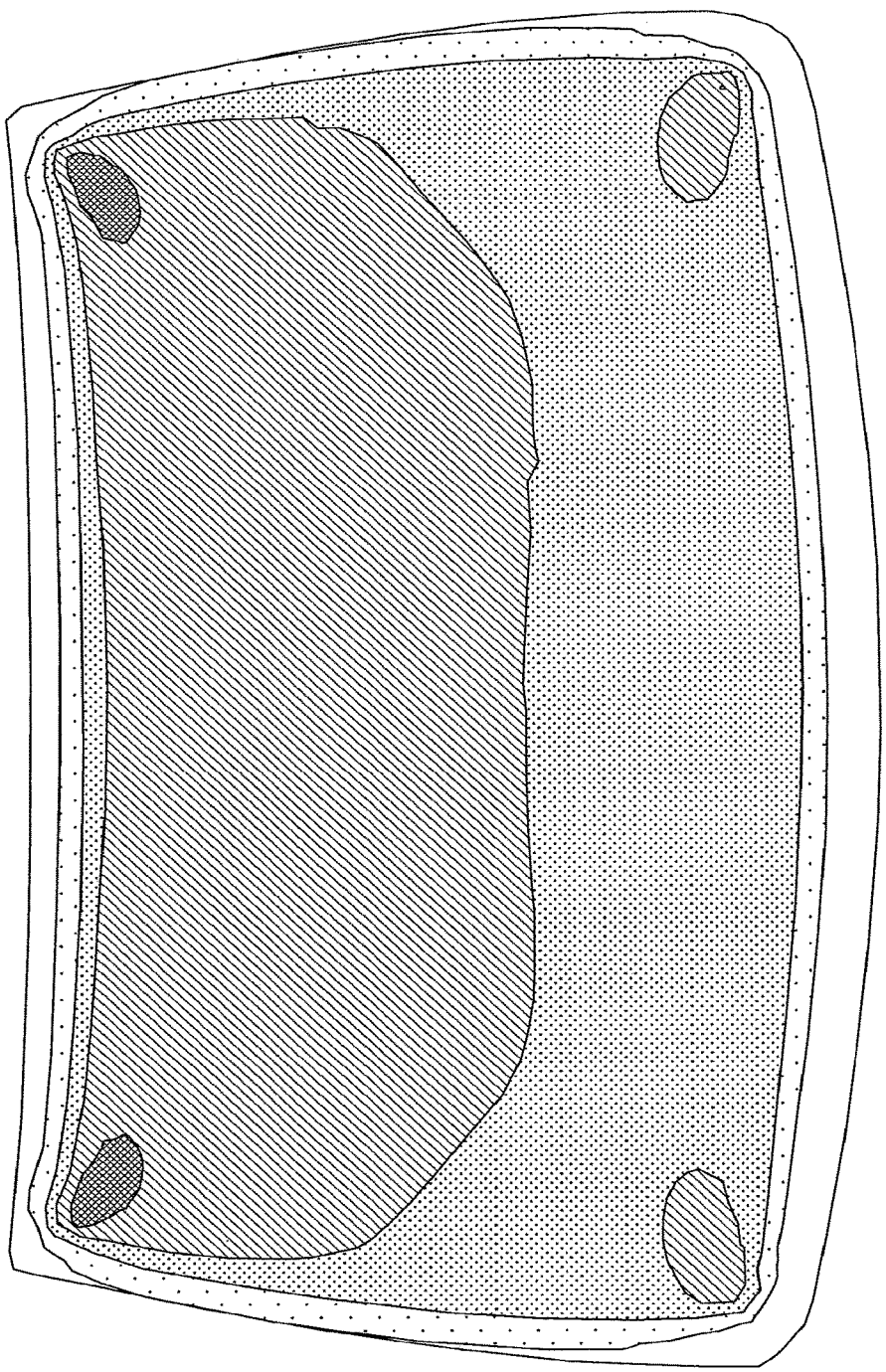
FIG. 13 is a diagram illustrating temperature distribution in a case of applying voltage to the laminated glass according to the fifth sample.
Figure 13:
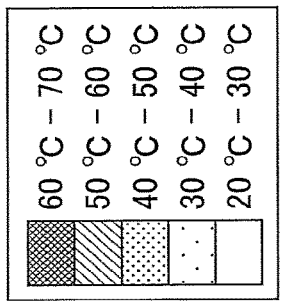

FIG. 4 is a diagram illustrating the laminated glass according to a first sample. FIG. 5 is a diagram illustrating temperature distribution in a case of applying voltage to the laminated glass according to the first sample. FIG. 6 is a diagram illustrating the laminated glass according to a second sample. FIG. 7 is a diagram illustrating temperature distribution in a case of applying voltage to the laminated glass according to the second sample. FIG. 8 is a diagram illustrating the laminated glass according to a third sample. FIG. 9 is a diagram illustrating temperature distribution in a case of applying voltage to the laminated glass according to the third sample. FIG. 10 is a diagram illustrating the laminated glass according to a fourth sample. FIG. 11 is a diagram illustrating temperature distribution in a case of applying voltage to the laminated glass according to the fourth sample. FIG. 12 is a diagram illustrating the laminated glass according to a fifth sample. FIG. 13 is a diagram illustrating temperature distribution in a case of applying voltage to the laminated glass according to the fifth sample. In FIGS. 4, 6, 8, 10, and 12, reference numeral 12 represents a transparent conductive film, reference numeral 13 represents a left bus bar, reference numeral 14 represents a right bus bar, and reference numerals L1 to L6, H1 to H13 represent dimensions (mm). L1 is 1160, L2 is 1136, L3 is 1207, L4 is 1305, L5 is 1345, L6 is 1402, H1 is 801, H2 is 44, H3 is 71, H4 is 100, H5 is 129, H6 is 158, H7 is 188, H8 is 218, H9 is 483, H10 is 318, H11 is 583, H12 is 693, and H13 is 632. Further, in FIGS. 4, 6, 8, 10, and 12, the double-line represents a slit, and the width of the slit is 3 mm. In FIGS. 5, 7, 9, 11, and 13, the dash "-" representing a numeric range includes the numeric value on its left side but does not include the numeric value on its right side. For example, "20° C.-30° C." indicates a range that is greater than or equal to 20° C. but less than 30° C.

In the first to fifth samples, analysis was performed under the same conditions except for the position or number of slits.

In the first sample, two slits are formed in the transparent conductive film, and the transparent conductive film is divided into three regions as illustrated in FIG. 4. The region having the shortest bus bar distance (uppermost region) has a shorter vertical direction width compared to the other regions. On the other hand, the region of a center part of the transparent conductive film in the vertical direction and the region of a lower part of the transparent conductive film in the vertical direction have equal vertical direction width. Among the three regions of the first sample, the bus bar distance of a region is shorter, the shorter the vertical direction width of the region.

In the second sample, four slits are formed in the transparent conductive film, and the transparent conductive film is divided into five regions as illustrated in FIG. 6. Three regions are formed on the upper part of the transparent conductive film. Among the three regions, the vertical direction width of a region is shorter, the shorter the bus bar distance of the region. In addition, the bus bar distance of a region is shorter, the shorter the vertical direction width of the region. On the other hand, the region of a center part of the transparent conductive film in the vertical direction and the region of a lower part of the transparent conductive film in the vertical direction have equal vertical direction widths. Among the five regions of the second sample, the bus bar distance of a region is shorter, the shorter the vertical direction width of the region.

In the third sample, seven slits are formed in the transparent conductive film, and the transparent conductive film is divided into eight regions as illustrated in FIG. 8. Six regions are formed on the upper part of the transparent conductive film. The six regions have equal vertical direction widths and have shorter vertical directions widths than the region of a center part of the transparent conductive film in the vertical direction and the region of a lower part of the transparent conductive film in the vertical direction. On the other hand, the region of the center part of the transparent conductive film in the vertical direction and the region of the lower part of the transparent conductive film in the vertical direction have equal vertical direction widths. Among the eight regions of the third sample, the bus bar distance of a region is shorter, the shorter the vertical direction width of the region.

In the fourth sample, three slits are formed in the transparent conductive film, and the transparent conductive film is divided into four regions as illustrated in FIG. 10. Among the four regions of the fourth sample, the vertical direction width of a region is shorter, the shorter the bus bar distance of the region. In addition, the bus bar distance of a region is shorter, the shorter the vertical direction width of the region.

In the fifth sample, no slit was formed as illustrated in FIG. 12.

As evident in FIGS. 4 to 13, owing to the forming of slits in appropriate positions, it can be understood that the first to fourth samples were able to reduce the number of local regions of high temperature and significantly prevent the problem of local heating in comparison with the fifth sample having no slits formed.

[Sixth Sample]

In the sixth sample, the results of measuring antenna gain with slits formed in respective positions are described.

Figure 14:
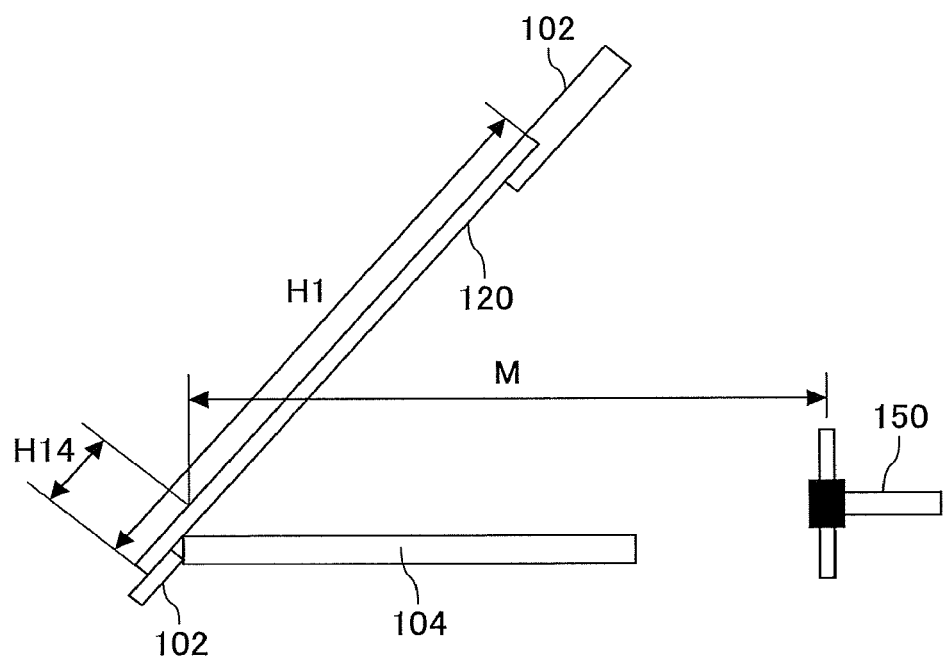
FIG. 14 is a diagram illustrating a position of a receiver antenna for measuring antenna gain according to a sixth example.

FIG. 14 is a diagram illustrating a position of a receiver antenna for measuring antenna gain according to the sixth example. In FIG. 14, reference numeral 102 represents a window frame of an automobile, reference numeral 104 represents a dashboard of the automobile, reference numeral 120 represents a laminated glass, reference numeral 150 represents a receiver antenna, and reference numerals H1, H14, and M represent dimensions (mm). H1 is 801, H14 is 140, and M is 1000.

Antenna gain was measured by transmitting vertically polarized electromagnetic waves to the outside of the vehicle in a direction of the laminated glass 120 placed on a horizontal turntable and assembled to the window frame 20 of the vehicle and receiving the electromagnetic waves transmitted through the laminated glass 120 with the receiver antenna 150 inside the vehicle. The tilt angle θ relative to a horizontal plane of the laminated glass 120 was approximately 30 degrees. The tilt angle θ was measured at a center of the laminated glass 120 in the vehicle width direction. The vehicle center of the automobile was positioned on a center rotation axis of the turntable.

A laminated glass including a copper foil serving as an alternative of the transparent conductive film, a glass plate, and an intermediate film, and a glass plate in this order was used as the laminated glass 120. Further, a laminated glass having no bus bars was used as the laminated glass. The configuration of the laminated glass 120 is the same except for the position in which the slit was formed in the copper foil. The configuration of the laminated glass 120 is described mainly regarding the position of the slit.

Table 1 illustrates the position of the slit(s) formed in the copper foil. The positions 1 to 7 indicated in Table 1 correspond to the positions of the seven slits illustrated in FIG. 8 and are arranged in an ascending order from the top of FIG. 8 to the bottom of FIG. 8. The position 1 corresponds to the uppermost position in FIG. 8. The slits of positions 1 to 7 are formed with dimensions corresponding to the slits illustrated in FIG. 8.

TABLE 1

| | NUMBER OF POSITION FORMED WITH SLIT |
|---|---|
| CONDITION 1 | No. 1, No. 3, No. 5 |
| CONDITION 2 | No. 2, No. 4, No. 6 |
| CONDITION 3 | No. 1, No. 3, No. 5, No. 7 |
| CONDITION 4 | No. 2, No. 4, No. 6, No. 7 |
| CONDITION 5 | No. 1, No. 2, No. 3, No. 4, No. 5, No. 6 |
| CONDITION 6 | No. 1, No. 2, No. 3, No. 4, No. 5, No. 6, No. 7 |

A half-wave dipole antenna MP651B (manufactured by Anritsu Corp.) was used as the receiver antenna 150 for receiving electromagnetic waves in a 800-1000 MHz frequency band used for mobile phones and the like, and a half-wave dipole antenna MA5612B2 (manufactured by Anritsu Corp.) was used as the receiver antenna 150 for receiving electromagnetic waves in a 1700-1960 MHz frequency band. The receiver antenna 150 was connected to a network analyzer via a coaxial cable. An element of the receiver antenna 150 was placed orthogonal to the ground in the center in the vehicle width direction. The position of the receiver antenna 150 was set at the same height as the electromagnetic wave transmitting position relative to the ground (1080 mm). The elevation angle of the receiving position of the receiver antenna 150 relative to the electromagnetic wave transmitting position was set to 0 degrees (assuming that the elevation angle for the direction parallel to the ground is 0 degrees and that the elevation angle for the zenith direction is 90 degrees). The horizontal distance M between the element of the receiver antenna 150 and the front surface of the laminated glass 120 of the outer side of the vehicle in the vehicle front/rear direction was approximately 1000 mm.

The data of antenna gain amounting to 120 degrees for each frequency of the electromagnetic waves were averaged by rotating the turntable in a range of ±60 degrees relative to a reference position and receiving the electromagnetic waves for each single rotation angle 1° with the receiver antenna 150. The reference position of the turntable is the position in which the receiver antenna 150 is in the electromagnetic wave transmitting position in the front/rear direction of the vehicle. The measuring frequency of the antenna gain was every 20 MHz in each frequency band. The difference (G1-G2) between the antenna gain G1 (dB) for each condition in Table 1 and the antenna gain G2 (dB) for a case where no slit is formed in the copper foil is referred to as "gain difference".

Table 2 illustrates the average gain difference in each frequency band.

TABLE 2

| | AVERAGE GAIN DIFFERENCE (dB) | |
|---|---|---|
| | 800 MHz-1000 MHz | 1700 MHz-1960 MHz |
| CONDITION 1 | 1.1 | 0.6 |
| CONDITION 2 | 1.1 | 0.6 |
| CONDITION 3 | 1.4 | 0.7 |
| CONDITION 4 | 1.4 | 0.7 |
| CONDITION 5 | 2.0 | 1.6 |
| CONDITION 6 | 2.4 | 1.8 |

Figure 15:
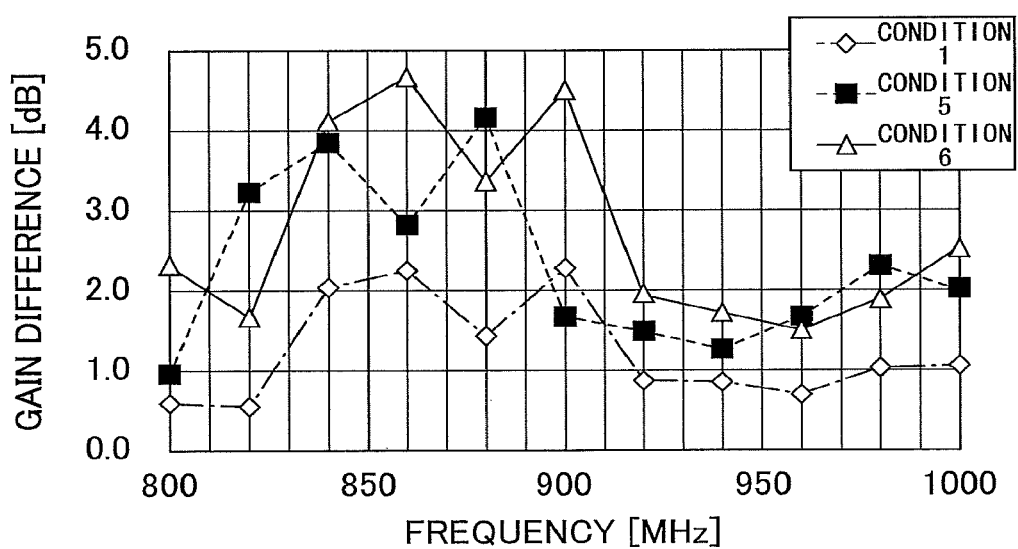
FIG. 15 is a graph illustrating gain difference and frequency characteristics in a frequency band of 800 MHz to 1000 MHz under conditions 1, 5, and 6.
Figure 16:
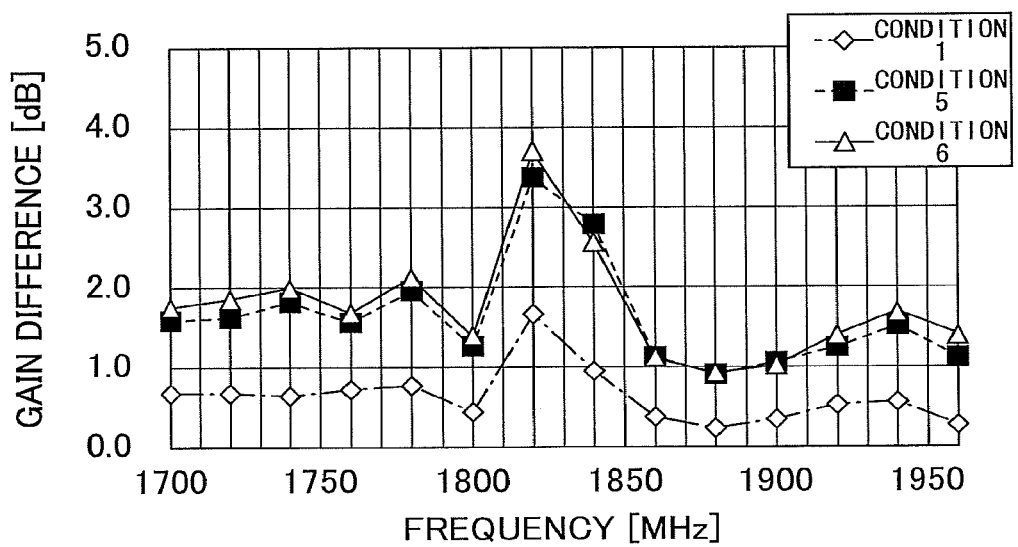
FIG. 16 is a graph illustrating gain difference and frequency characteristics in a frequency band of 1700 MHz to 1960 MHz under conditions 1, 5, and 6.

FIG. 15 is a graph illustrating gain difference and frequency characteristics in a frequency band of 800 MHz to 1000 MHz under conditions 1, 5, and 6. FIG. 16 is a graph illustrating gain difference and frequency characteristics in a frequency band of 1700 MHz to 1960 MHz under conditions 1, 5, and 6. In FIGS. 15 and 16, the vertical axis represents "gain difference" whereas the horizontal axis represents "frequency".

According to Table 2, FIG. 15, and FIG. 16, it can be understood that antenna gain and electromagnetic wave transmittance improve by increasing the number of slits. For example, according to the comparison between condition 5 and condition 6 illustrated in Table 2, the average gain difference in the 800 MHz-1000 MHz frequency band improves 0.4 dB by adding a slit in position 7, and the average gain difference in the 1700 MHz-1960 MHz frequency band improves 0.2 dB by adding a slit in position 7. Further, according to Table 2, FIG. 15, and FIG. 16, it can be understood that influence due to the difference in the slit position is small. The slit may be arranged in a position that reduces the problem of local heating.

According to the above-described embodiments of the present invention, there can be provided a plate for an electro-thermal window that prevents local areas from being heated to a high temperature.

Although embodiments of a plate for an electro-thermal window have been described embodiment, the present invention are not limited to the above-described embodiments. Variations and modifications may be made without departing from the scope of the present invention.

For example, the transparent conductive film 12 of the above-described embodiment has an upper side that is shorter than its lower side as illustrated in FIG. 1. However, the upper side may be longer than the lower side. In this case, the bus bar distance becomes shorter from the upper side to the lower side.

Further, although the transparent conductive film 12 of the above-described embodiment transmits vertically polarized waves, other waves such as horizontally polarized waves or circularly polarized waves may also be transmitted through the transparent conductive film 12. For example, the transparent conductive film 12 may include a slit parallel to the vertical direction for transmitting horizontally polarized waves therethrough.

Further, another region may be provided between the first region 31 and the second region 32 illustrated in FIG. 1. The size difference between the bus bar distance of the other region and the bus bar distance of the first region 31 and the size difference between the vertical direction width of the other region and the vertical direction width of the first region 31 are not to be limited in particular. Similarly, the size difference between the bus bar distance of the other region and the bus bar distance of the second region 32 and the size difference between the vertical direction width of the other region and the vertical direction width of the second region 32 are not to be limited in particular. For example, in a case of a front glass for an automobile, the other region may be provided at the middle of the plate for a window 11 in the vertical direction for ensuring the view of the driver. In this case, the vertical direction width of the other region may be formed with a longer width than the vertical direction width of the second region 32.

The invention claimed is:

1. A plate for an electro-thermal window, comprising:
a transparent plate;
a transparent conductive film formed on a surface of the transparent plate having a first side, a second side on an opposite side with respect to the first side, a left side extending from the first side to the second side, and a right side extending from the first side to the second side such that the transparent conductive film is configured to heat the transparent plate; and
a plurality of bus bars formed on the surface of the transparent plate and configured to feed power the transparent conductive film such that the plurality of bus bars includes a left bus bar connected to the left side of the transparent conductive film and having a linear shape extending from the first side to the second side of the transparent conductive film, and a right bus bar connected to the right side of the transparent conductive film and having a linear shape extending from the first side to the second side of the transparent conductive film,
wherein the transparent conductive film has a plurality of slits continuously or discontinuously extending in parallel from the left bus bar to the right bus bar such that the plurality of slits divides the transparent conductive film into a plurality of regions including a first region at the first side and a second region at the second side, that a linear distance between the left bus bar and the right bus bar of the first region is shorter than a linear distance between the left bus bar and the right bus bar of the second region, that a width of the first region in a direction orthogonal to the slit is shorter than a width of the second region in the direction orthogonal to the slit, and that the plurality of slits forms a frequency selective surface through hick a vertically polarized electromagnetic wave of a predetermined frequency band is transmitted.

2. The plate for an electro-thermal window as claimed in claim 1, wherein the transparent conductive film is divided into three by the plurality of slits.

3. The plate for an electro-thermal window as claimed in claim 1, wherein the plurality of the regions in the transparent conductive film is formed such that the shorter a width of a region is, the shorter a linear distance of the region is.

4. The plate for an electro-thermal window as claimed in claim 2, wherein the plurality of the regions in the transparent conductive film is formed such that the shorter a linear distance of a region is, the shorter a width of the region is.

5. The plate for an electro-thermal window as claimed in claim 1, wherein the plurality of the regions in the transparent conductive film is formed such that the linear distance between the left bus bar and the right bus bar gradually becomes longer from the first side forming an upper side to the second side forming a lower side.

6. The plate for an electro-thermal window as claimed in claim 1, wherein a wavelength of the transparent plate satisfies $\lambda_g = \lambda_0 \times k$ where $\lambda_0$ is a wavelength of a center frequency in the predetermined frequency band in an atmosphere and k is a wavelength shortening rate of the transparent plate, and an interval at least between a pair of adjacent slits is less than or equal to $\lambda_g/4$.

7. The plate for an electro-thermal window as claimed in claim 1, wherein the plurality of the regions in the transparent conductive film is formed such that the linear distance between the left bus bar and the right bus bar gradually becomes longer from the second side forming a lower side to the first side forming an upper side.

8. The plate for an electro-thermal window as claimed in claim 1, wherein the plurality of slits is formed in an area that is not greater than 500 mm from the first side forming an upper side of the transparent conductive film.

9. The plate for an electro-thermal window as claimed in claim 1, wherein the transparent conductive film is formed such that each of the slits has a length of at least 40 mm.

10. The plate for an electro-thermal window as claimed in claim 1, wherein the transparent conductive film is formed such that each of the slits has a length of at least 85 mm.

11. The plate for an electro-thermal window as claimed in claim 1, wherein the plurality of slits is formed such that an interval between adjacent slits is 43 mm or less.

12. The plate for an electro-thermal window as claimed in claim 1, wherein the plurality of slits is formed such that an interval between adjacent slits is 20 mm or less.

13. The plate for an electro-thermal window as claimed in claim 1, wherein the transparent conductive film is formed such that the plurality of slits is extending continuously from the left bus bar to the right bus bar.

14. The plate for an electro-thermal window as claimed in claim 1, wherein the transparent conductive film is formed such that the plurality of slits is extending discontinuously from the left bus bar to the right bus bar with a gap of 32 mm or less.

15. The plate for an electro-thermal window as claimed in claim 1, wherein the transparent conductive film is formed such that the plurality of slits is extending discontinuously from the left bus bar to the right bus bar with a gap of 16 mm or less.

16. The plate for an electro-thermal window as claimed in claim 1, wherein the transparent conductive film has a trapezoid form having the first side forming an upper side and the second side forming a lower side.

17. The plate for an electro-thermal window as claimed in claim 13, wherein the plurality of the regions in the transparent conductive film is formed such that the linear distance between the left bus bar and the right bus bar gradually becomes longer from the first side forming an upper side to the second side forming a lower side.

18. The plate for an electro-thermal window as claimed in claim 1, wherein the transparent conductive film has a trapezoid form having the first side forming an upper side and the second side forming a lower side such that a difference in length between the upper side and the lower side is not less than 10%.

19. The plate for an electro-thermal window as claimed in claim 1, wherein the plurality of the regions in the transparent conductive film is formed such that the linear distance between the left bus bar and the right bus bar gradually becomes shorter from the second side forming a lower side to the first side forming an upper side, the plurality of slits is formed in an area that is not greater than 500 mm from the first side forming an upper side of the transparent conductive film, and the transparent conductive film is formed such that each of the slits has a length of at least 40 mm.

20. A windshield of an automobile, comprising:
the plate for an electro-thermal window of claim 1.

* * * * *